(No Model.)

G. M. MOWBRAY.
Metallic Circuit for Electrical Transmission.

No. 243,290. Patented June 21, 1881.

Attest,
H. H. Howard
M. J. Clagett

Inventor,
George M. Mowbray
by Dyer & Wilber
Attys

UNITED STATES PATENT OFFICE.

GEORGE M. MOWBRAY, OF NORTH ADAMS, MASSACHUSETTS.

METALLIC CIRCUIT FOR ELECTRICAL TRANSMISSION.

SPECIFICATION forming part of Letters Patent No. 243,290, dated June 21, 1881.

Application filed March 24, 1881. (No model.)

*To all whom it may concern:*

Be it known that I, GEORGE M. MOWBRAY, of North Adams, in the county of Berkshire and State of Massachusetts, have invented a new and Improved Metallic Circuit for Electrical Transmission; and I do hereby declare that the following is a full and exact description of the same, reference being had to the accompanying drawings, and to the letters of reference marked thereon.

My invention consists of two conductors combined and arranged in close proximity to each other, one uninsulated, with or without ground-connections, the other insulated, the pair forming a complete circuit for electrical purposes.

The construction as hereinafter described is durable, not liable to get out of order, convenient for laying under ground or under water, as easily set up on poles as the ordinary telegraph or telephone wires, can be readily repaired, and is of moderate cost, and the arrangement of the wires satisfies the dual nature of an electric current, so that when a number of circuits are bunched together in contact each individual circuit transmits without injurious interference with the others.

In order better to understand my invention reference may be made to the drawings accompanying this specification, showing eight figures enlarged, for sake of distinctness, to four times their natural size, and in which—

Figure 1:
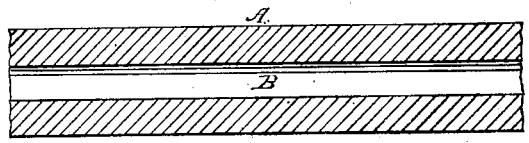
Figure 2:
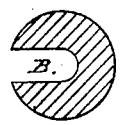
Figure 3:
Figure 4:
Figure 5:
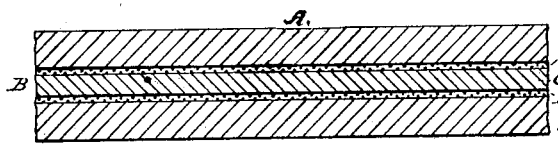
Figure 6:
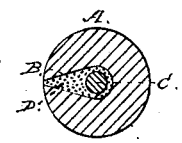
Figure 7:
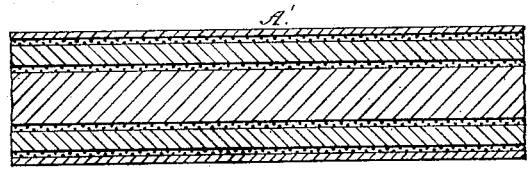
Figure 8:
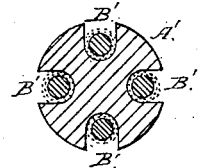
Figure 9:
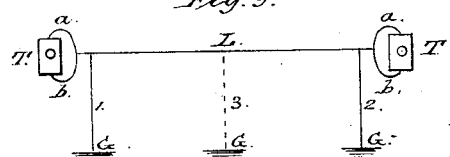

Figure 1 is a lineal section of the outer protective conductor; Fig. 2, a cross-section of the same, showing its grooves; Fig. 3, a lineal section of inner insulated wire; Fig. 4, a cross-section of Fig. 3; Fig. 5, a lineal section of the outer protective conductor, with the inner insulated wire or core in position; Fig. 6, a cross-section of same; Fig. 7, a lineal section of a four-grooved rod or wire, and Fig. 8 a cross-section of same, with four insulated wires in position, and before the jaws of the grooves are approximated. Fig. 9 shows, diagrammatically, an entire metallic circuit with ground-connections.

A represents a well-annealed soft-iron telegraph-wire of suitable diameter, say, from No. 3 to No. 7, American wire-gage, in which is first run a groove, B, in the direction of its length, as shown in Fig. 1, and to a depth of about three-fifths its diameter, as shown in Fig. 2.

C represents copper wire of, say, from No. 14 to No. 24, American wire-gage, insulated in any suitable manner, as shown by the letter D in Figs. 3 and 4, the common methods of spirally winding with yarn of cotton, hemp, or jute, and then slushing in a hot cement of gas-tar tempered by evaporation and addition of asphaltum, being suitable. This insulated copper wire, while the insulating-cement is hot and plastic, is inserted in the groove B of the soft-iron wire, as shown in Fig. 5. Finally, these two conductors, the outer protective grooved wire, A, carrying in its groove B the inner insulated core, C D, are passed between suitable rollers or drawn through a suitable die, so as to nearly but not quite close up the jaws of the groove, as shown in Fig. 6. With a larger outer wire or rod, A', a series of grooves, B', may be drawn or pressed, say three, four, five, or six, and into each of these an insulated copper core may be inserted, as shown in Fig. 8 in cross-section, where four grooves are shown, each carrying an insulated conducting-core previous to the final process of closing these grooves to the point of approximating the jaws of the several grooves nearly but not quite together. Multiple cores thus embedded might serve for a short river or lake cable, but for underground communication, telephonic or telegraphic, I prefer bunching a series of single-grooved wires, hereinbefore described, because less cumbersome to handle and easier to repair in case of injury.

I do not confine myself to iron alone for the outer conductor, nor to copper only for the inside core, nor to any particular material for the insulation, but prefer the above metals on account of their tenacity, durability, and relative conductive power, and a fibrous insulation, rather than a plastic gum alone, because any fibrous material will be less apt to permit contact between the two conductors than simple gums without interposed fiber.

The jaws or edges of the grooves should not be brought together so as to touch, neither should they overlap, because I have found that injurious or undesirable effects are less pronounced, and are more readily and rapidly dissipated with a slotted envelope than with an envelope made seamless, or so as to entirely surround the inner conductor.

The requisite size of the two conductors must be determined by the electrician, and depends on the distance or length of circuit, and necessary current to overcome the resistance.

In Fig. 9 this wire, used as a complete metallic circuit, is shown as combined with ground-connections.

T T represent, arbitrarily, any form of electrical apparatus, such as relays, telephones, and the like.

The line L is formed of the compound wire, the case *a* and envelope *b* being separated at the terminals to make proper connections with T T. Connected to the envelope *b* are ground-wires 1 2, at the terminals, or 3 in the center of the line, or either or all may be used, so that the potential of the earth and the line shall be maintained constant, while at the same time all the advantages of both complete metallic and earth circuits are secured.

Having thus described my invention, what I claim as new therein, and desire to secure by Letters Patent, is—

1. A compound electrical wire consisting of an insulated conductor nearly surrounded by an enveloping-conductor, substantially as set forth.

2. A compound wire for forming a complete metallic circuit formed of a metallic protective covering forming one member of the circuit, and nearly surrounding an inner insulated metallic core forming the other member of the circuit, substantially as set forth.

3. The combination, with a complete metallic circuit for electrical uses formed of a compound wire having an insulated core and exterior metallic covering nearly surrounding the core, of one or more ground-connections, substantially as set forth.

This specification signed and witnessed this 12th day of March, 1881.

GEO. M. MOWBRAY.

Witnesses:
W. B. HOUGHTON,
J. R. WHITE.